United States Patent Office 3,032,596
Patented May 1, 1962

3,032,596
NITRO-SUBSTITUTED ALPHA,ALPHA' DICHLORO-p-XYLENE

Robert F. Lindemann, Painesville, Ohio, assignor to Diamond Alkali Company, Cleveland, Ohio, a corporation of Delaware
No Drawing. Filed Apr. 30, 1958, Ser. No. 731,881
1 Claim. (Cl. 260—646)

The present invention relates to novel nitro-substituted xylene derivatives represented by the structure:

(I)

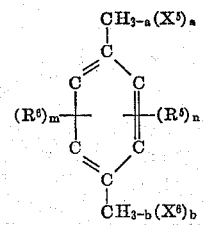

wherein $n$ and $m$ are numbers from 0 to 3, inclusive, the sum of $n$ and $m$ not exceeding 3; $a$ and $b$ are numbers from 1 to 2, inclusive; $R^5$ is halogen, i.e., fluorine, chlorine, bromine, and iodine, chlorine being preferred, and $R^6$ is a nitro radical; $X^5$ and $X^6$ are halogen atoms, chlorine being preferred; any free bonds being satisfied by hydrogen; and to their preparation and application.

The preferred compound of this invention is alpha,alpha'-dichloro-2-nitro-p-xylene.

The compounds within the scope of the structure I above may be prepared by nitrating a compound of the structure:

(II)

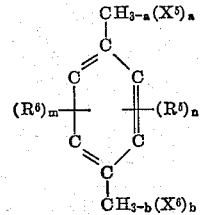

wherein $n$ and $m$ are numbers from 0 to 3, inclusive; $a$ and $b$ are numbers from 1 to 2, inclusive; $R^5$ is halogen, chlorine being preferred, and $R^6$ is a nitro radical; $X^5$ and $X^6$ are halogen atoms, chlorine being preferred, any free bonds being satisfied by hydrogen.

It is necessary to employ as concentrated nitric acid as possible, e.g., at least 69–71% nitric acid, preferably fuming nitric acid, and pure reactants to minimize or prevent hydrolysis or oxidation due to the presence of impurities such as organic acids.

The temperature of the reaction is preferably kept below 50° C., i.e., 0°–40° C., cooling generally being necessary. The reaction time is less than five hours, e.g., about one-tenth to one and one-half hours.

Preferred compounds which may be nitrated according to the practice of the present invention are alpha,alpha'-dichloro-p-xylene; alpha,alpha'-dibromo-p-xylene; alpha,alpha',5-tribromo-p-xylene.

It will be understood, of course, that the compounds of the present invention may be utilized in diverse formulations both liquid and solid, including finely-divided powders and granular materials, solutions, concentrates, emulsifiable concentrates, slurries, and the like, depending upon the biological application intended and the formulation medium desired. Thus it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically water and various organic liquids, such as kerosene, benzene, toluene, xylene, cyclohexanone and other petroleum distillate fractions or mixtures thereof.

When liquid formulations are employed, or dry materials prepared which are to be used in liquid form, it is desirable in certain instances to additionally employ a wetting, emulsifying or dispersing agent to facilitate use of the formulation, suitable surface active agents being set out, e.g., in an article by John W. McCutcheon in Soap and Chemical Specialties, vol. 31, Nos. 7–10 (1955).

The term "carrier" as employed in the specification and claims is intended to refer broadly to the materials constituting a major proportion of a biologically active or other formulation and hence includes finely-divided material, both liquids and solids, as aforementioned, conventionally used in such applications.

The compounds of the present invention may be used alone or in combination with other known biologically active materials, such as chlorinated hydrocarbons, organic phosphorus compounds, foliage and soil fungicides, pre- and post-emergent herbicides and the like.

The term "fungicide" as used in the specification and claims is intended to refer broadly to a composition of matter effective in controlling or killing collectively or selectively fungus growth which is either parasitic or saprophytic, such as the control of fungus spore germination, blight infestation, e.g., control of early and late blight disease, and chemotherapeutic control of blight and mildew infestation, i.e., the protection of plants by contacting the soil around the plants with a fungicidal amount of a compound within the scope of structure I, and the protection of seeds and seedlings, i.e., the protection of seeds and seedlings from seed decay and damping off fungi; moreover, it is preferred that the fungus be contacted with a fungicidal amount of the composition.

In order to demonstrate this fungicidal activity, a series of tests are run incorporating evaluations of the fungicidal effectiveness of compounds within the scope of structure I against (A) fungus spore germination, i.e., the spore germination of *Alternaria oleracea* and *Monilinia fructicola*, and (B) blight fungi, e.g., the early and late blight fungus.

The procedures of fungicidal evaluation A and B are as follows:

The procedure in fungicidal evaluation A above concerning fungicidal spore germination against *Alternaria oleracea* and *Monilinia fructicola* is:

Spore germination tests on glass slides are conducted via the test tube dilution method adopted from the procedure recommended by the American Phytopathological Society's committee on standardization of fungicidal tests. In this procedure, the test chemical in aqueous formulations at concentrations of 1000, 100, 10 and 1.0 p.p.m. is tested for its ability to inhibit germination of spores from 7 to 10 day old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° C. by counting 100 spores. Each test compound is given a rating which corresponds to the concentration that inhibits germination of half the spores (ED 50 value):

Employing this procedure the alpha,alpha'-dichloro-2-nitro-p-xylene receives an ED 50 value of less than 10 p.p.m. for both the *Alternaria oleracea* and *Monilinia fructicola*.

The procedure is fungicidal evaluation B above concerning early blight control is:

A tomato foliage disease test is conducted measuring the ability of the test compound to protect tomato foliage against infection of the early blight fungus *Alternaria solani*. Tomato plants 5 to 7 inches high of the variety Bonny Best are employed. The plants are sprayed with 100 ml. of test formulation at 2000 p.p.m. and 400 p.p.m. test chemical in combination with 5% acetone—0.01% Triton X–155—balance water at 40 lbs. air pressure while being rotated on a turntable in a spray chamber. After the spray deposit is dry, the treated plants and comparable untreated controls are sprayed with a spore suspension containing approximately 20,000 conidia of *Alternaria solani* per ml. The plants are held in a 100% humid atmosphere for 24 hours at 70° F. to permit spore germination and infection. After 2 to 4 days, lesion counts are made on the three uppermost fully expanded leaves. Employing this procedure alpha,alpha'-dichloro-2-nitro-p-xylene affords better than 55% disease control.

The term "herbicide" as used is intended to refer broadly to a composition of matter effective in controlling or killing, collectively or selectively, undesirable plant growth, such as the selective or nonselective control of grasses or broadleaf plants, and the selective or nonselective prevention of seed development. It is preferred that plants be contacted with an herbicidal amount of a compound within the scope of structure I.

In order to demonstrate and compare herbicidal activity, a series of tests is run incorporating evaluations of the herbicidal effectiveness of compounds within the scope of structure I. These evaluations test the ability of the compounds of the present invention to (A) prevent the germination of seeds, i.e., the prevention of germination of perennial rye grass and radish seeds, and the prevention of germination of broadleaf and grass seeds; and (B) control or kill plant growth by spraying a test formulation of the test compound on the plants, i.e., the effect of spraying of a formulation of the test compound on tomato, bean, corn and oat plants. The precedures of herbicidal evaluation A and B are as follows, the data resulting being found in Table I.

The procedure in herbicidal evaluation A above concerning the prevention of germination of perennial rye grass and radish seeds is:

Seeds of perennial rye grass and radish are treated in Petri dishes with aqueous suspensions of the test chemical at 1000 and 100 p.p.m. (1000 or 100 p.p.m. test chemical—5% acetone—0.01% Triton X–155—balance water). Lots of 25 seeds of each type are scattered in separate dishes containing filter paper discs moistened with 5 ml. of the test formulation at each concentration. After 7 to 10 days under controlled conditions the test compound is given a rating which corresponds to the concentration that inhibits germination of half of the spores (ED 50 value) in the test or greater. Data resulting is given in Table I in which B equals 10–100 p.p.m.; C equals 100–1000 p.p.m.; D equals greater than 1000 p.p.m.

The procedure in herbicidal evaluation A above concerning the prevention of germination of broadleaf and grass seeds is:

To evaluate the effect of the test chemical upon the germination of seeds in soil, a mixture of seeds of six crop plants is broadcast in 8" x 8" x 2" metal cake pans filled to within ½ inch of the top with composted greenhouse soil. The seed is uniformly covered with about ¼ inch of soil and watered. After 24 hours, 80 ml. of an aqueous test formulation (320 mg. test chemical—5% acetone—0.01% Triton X–155—balance water) at 10 lbs. air pressure is sprayed uniformly over the surface of the pan. This is equivalent to 64 lbs./acre. The seed mixture contains representatives of three broadleafs: turnip, flax and alfalfa, and three grasses: wheat, millet and rye grass. Two weeks after treatment records are taken on seedling stand as compared to the controls. Resultant data is given in Table I.

The procedure in herbicidal evaluation B above concerning the effect of spraying of a formulation of the test compound on tomato, bean, corn and oat plants is:

Tomato plants, variety Bonny Best, 5 to 7 inches tall; corn, variety Cornell M-1 (field corn), 4 to 6 inches tall; bean, variety Tendergreen, just as the trifoliate leaves are beginning to unfold; and oats, variety Clinton, 3 to 5 inches tall, are sprayed with an aqueous test formulation (0.64% test chemical—5% acetone—0.01% Triton X–155—balance water). The plants are sprayed with 100 ml. at 40 lbs. air pressure while being rotated on a turntable in a spray hood. Records are taken 14 days after treatment and phytotoxicity is rated on a scale from 0 for no injury, to 11 for plant kill. Ratings are given in Table I.

TABLE I

*Herbicidal Activity of Compounds Within the Scope of Structure I*

| | Test | | | | | | |
|---|---|---|---|---|---|---|---|
| | A | | A | | B | | |
| Compound | Conc. which inhibits germ. at least 50% | | Percent Stand | | Phytotoxicity Rating 11 equals plant kill | | |
| | Radish | Rye Grass | Broadleaf | Grass | Tomato | Corn | Bean | Oats |
| alpha,alpha'-dichloro-2-nitro-p-xylene | C | B | 20 | 2 | 11 | 11 | 4 | 5 |

The term "nematocide" as used is intended to refer broadly to a composition of matter effective in controlling or killing, collectively or selectively, nematode growth such as the control of plant parasite nematodes, i.e., the control of the root knot nematode (Meloidogyne), and the control of nonplant parasite nematodes, i.e., the control of the sour paste nematode (*Panagrellus redivivus*). It is preferred that the nematodes be contacted with a nematocidal amount of the composition of the present invention.

In order to demonstrate the nematocidal activity of the present invention a series of tests are run incorporating evaluations of the nematocidal effectiveness of compounds within the scope of structure I. These evaluations test the nematocidal activity against (A) the root knot nematode, a plant parasite nematode, and (B) the nonplant parasite nematode, *Panagrellus redivivus*, i.e., contact control. The procedures for nematocidal evaluations A and B above are as follows, the data resulting being in Table II.

The procedure of nematocidal evaluation A above concerning the control of the root knot nematode, a plant parasite nematode is:

In showing nematocidal activity of the product of part A of this example, composted greenhouse soil in one-half gallon glazed crocks is infested with 3–5 g. of knotted or galled tomato roots containing the root knot nematode, Meloidogyne. Treatment at a rate equivalent to 512 lbs./acre in a primary test (770 mg./crock) is effected by mixing the test chemical intimately with the soil. An indicator crop of squash or tomato is planted in the crocks 4 to 7 days after treatment and the degree of knotting or galling is used as an index of the nematocidal activity of the test material. A rating system of 0 for none to 5 for severe infestation comparable to controls is used. Resulting ratings are given in Table II.

The procedure of nematocidal evaluation B above concerning the contact control of the nonplant parasite nematode, Panagrellus redivivus is:

Nonplant parasite nematodes (Panagrellus redivivus) are exposed to the test chemical in small watch glasses (27 mm. diameter x 8 mm. deep) within a 9 cm. Petri dish. A test formulation comprising 500 p.p.m. test chemical—5% acetone—0.01% Triton X-155—balance water is used. Observations after 24 hours indicate percent disease control and is given in Table II.

TABLE II

*Nematocidal Activity of Compounds Within the Scope of Structure I*

| Compound | Test | |
| --- | --- | --- |
| | A | B |
| | root knot nematode, percent control | redivivus contact application, percent control |
| alpha,alpha'-dichloro-2-nitro-p-xylene | 70 | 100 |

The term "bactericide" is intended to refer broadly to a composition of matter effective in controlling or killing, collectively or selectively, bacteria (Schizomycetes), e.g., Erwinia, Escherichia, Xanthomonas and Staphylococcus. It is preferred that the bacteria be contacted with a bactericidal amount of the composition of the present invention. In order to demonstrate the bactericidal activity of the compounds of this invention a test is run evaluating bactericidal effectiveness against the bacteria, *Erwinia amylovora, Xanthomonas phaseoli, Staphylococcus aureus* and *Escherichia coli.*

The procedure used in these evaluations is:

The test chemical is mixed with distilled water containing 5% acetone and 0.01% Triton X-155, at a concentration of 1000 p.p.m. 5 ml. of the test formulation are put in each of 4 test tubes. To each test tube is added one of the organisms: *Erwinia amylovora, Xanthomonas phaseoli, Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-inoculated broth is incubated for 48 hours at 38° C. when growth is rated.

The results and data collected from this evaluation are listed in Table III. The data indicates percent bacterial growth control with ratings from 0 for from 0–25% growth inhibition, 1 for from 25–50% growth inhibition, 2 for from 50–75% inhibition, to 3 for 75–100% growth inhibition.

TABLE III

*Bactericidal Activity of Compounds Within the Scope of Structure I*

TEST

| Compound | Erwinia amylovora | Xanthomonas phaseoli | Staphylococcus aureus | Escherichia coli |
| --- | --- | --- | --- | --- |
| alpha,alpha'-dichloro-2-nitro-p-xylene | 3 | 3 | 0 | 0 |

Concerning the present invention the following specific example is not to be construed as limiting but rather is offered in order that those skilled in the art may more completely understand the present invention.

EXAMPLE I.—PREPARATION OF ALPHA,ALPHA'-DICHLORO-2-NITRO-p-XYLENE 40 g. of p-xylene dichloride is added slowly with constant stirring to 300 ml. of fuming nitric acid at room temperature, taking precaution not to allow the reaction temperature to rise above 40° C. Upon reaction completion, the mixture is poured into a larger volume of water, stirred for one hour, and cooled to precipitate the product which is filtered, washed and dried yielding the desired $C_8H_7Cl_2NO_2$ as indicated through the following elemental analytical data:

| Element | Actual, Percent by Weight | Calculated, Percent by Weight |
| --- | --- | --- |
| Cl | 32.2 | 32.1 |
| N | 6.33 | 6.36 |

It is to be understood that although the invention has been described with specific reference to particular embodiments thereof, it is not to be so limited since changes and alterations therein may be made which are within the full intended scope of this invention as defined by the appended claim.

What is claimed is:

The method of preparing alpha,alpha'-dichloro-2-nitro-p-xylene which comprises chemically reacting alpha, alpha'-dichloro-p-xylene and fuming nitric acid at a temperature below about 50° C. for a period of less than five hours.

References Cited in the file of this patent

UNITED STATES PATENTS

| 2,736,645 | Steward et al. | Feb. 28, 1956 |
| 2,768,217 | Buc | Oct. 23, 1956 |
| 2,841,483 | Swezey et al. | July 1, 1958 |
| 2,876,267 | Schenck | Mar. 3, 1959 |
| 2,883,320 | Nichell | Apr. 21, 1959 |
| 2,885,319 | Ligett et al. | May 5, 1959 |

FOREIGN PATENTS

| 107,501 | Germany | Jan. 23, 1898 |

OTHER REFERENCES

Nightingale: "Chem. Rev." 40, 117–140 (particularly page 120), February 1947. (Copy in Scientific Lib.)